United States Patent
Bleus

(10) Patent No.: US 8,044,535 B2
(45) Date of Patent: Oct. 25, 2011

(54) BACKUP POWER SYSTEM

(75) Inventor: Paul Bleus, Jupille (BE)

(73) Assignee: Constructions Electroniques+ Telecommunications, En Abrege "C.E.+T", Liege (Wandre) (BE)

( * ) Notice: Subject to any disclaimer, the term of this patent is extended or adjusted under 35 U.S.C. 154(b) by 427 days.

(21) Appl. No.: 12/160,147

(22) PCT Filed: Sep. 11, 2006

(86) PCT No.: PCT/EP2006/066237
§ 371 (c)(1),
(2), (4) Date: May 18, 2009

(87) PCT Pub. No.: WO2007/077043
PCT Pub. Date: Jul. 12, 2007

(65) Prior Publication Data
US 2010/0026093 A1    Feb. 4, 2010

(30) Foreign Application Priority Data
Jan. 5, 2006 (EP) .................................. 06100122

(51) Int. Cl.
*H02J 9/06* (2006.01)

(52) U.S. Cl. ........................................................ 307/64
(58) Field of Classification Search ............... 307/64–66
See application file for complete search history.

(56) References Cited

U.S. PATENT DOCUMENTS

| | | | | |
|---|---|---|---|---|
| 4,673,825 A | * | 6/1987 | Raddi et al. | 307/66 |
| 4,709,318 A | | 11/1987 | Gephart et al. | |
| 4,827,150 A | * | 5/1989 | Reynal | 307/66 |
| 5,771,161 A | * | 6/1998 | Jackson et al. | 363/40 |
| 5,834,858 A | * | 11/1998 | Crosman et al. | 307/66 |
| 6,385,056 B1 | | 5/2002 | Gucyski | |
| 6,424,119 B1 | | 7/2002 | Nelson et al. | |
| 6,603,672 B1 | | 8/2003 | Deng et al. | |
| 7,898,109 B2 | * | 3/2011 | Lopata | 307/65 |
| 2005/0162137 A1 | | 7/2005 | Tracy et al. | |

OTHER PUBLICATIONS

US 6,181,581, 01/2001, Johnson, Jr. et al. (withdrawn)

* cited by examiner

*Primary Examiner* — Albert W Paladini
(74) *Attorney, Agent, or Firm* — Ladas & Parry LLP

(57) ABSTRACT

A power backup processor and a method of operating the power backup processor suitable for a single-phase AC power supply and with a higher efficiency, at least when the critical load is fed with the single-phase AC power supply, while having a high availability and quality of voltage supply. This can avoid the drawbacks related to high DC voltages.

19 Claims, 4 Drawing Sheets

BACKUP POWER SYSTEM

The present invention relates to a power backup processor unit comprising a first AC input line comprising a first inductance and provided to be connected to an AC power supply, a first AC output line comprising a second inductance and provided to be connected to a critical load, a second AC output line provided to be connected to the critical load, a neutral line provided to be connected to a neutral port, first and second DC voltage busses provided to be connected to a DC power supply, a capacitor interposed between the first and second DC voltage busses, a first half-bridge circuit comprising first and second switches, wherein the first switch is connected between the first AC input line and the first DC voltage bus and the second switch is connected between the first AC input line and the second DC voltage bus, a second half-bridge circuit comprising third and fourth switches, wherein the third switch is connected between the first AC output line and the first DC voltage bus and the fourth switch is connected between the first AC output line and the second DC voltage bus, a third half-bridge circuit comprising fifth and sixth switches, wherein the fifth switch is connected between the neutral line and the first DC voltage bus and the sixth switch is connected between the neutral line and the second DC voltage bus. The processor further comprises a series of controllers provided to command the switches, wherein said series of controllers is provided to command at least the first to fourth switches using pulse width modulation. The present invention also relates to a method of operating said power backup processor.

Power backup processors are typically used in the telecommunication industry to ensure continuous delivery of AC energy to critical applications such as a central office of a telecommunication operator.

A configuration typically known from the state of the art and comprising a series of converters is illustrated in FIG. 1. In this configuration, a first converter 101, which is an AC/DC converter, has a first AC input and a first DC output. The first AC input comprises a first AC input line 119 and a neutral line 120. Said first AC input line 119 is provided to be connected to a single-phase AC power supply, whereas said neutral line 120 is provided to be connected to a neutral port. A second converter 102, which is a DC/AC converter, has a first DC input and a first AC output, which comprises a first AC output line 121 and a second neutral line 122. Said first AC output line 121 is provided to be connected to a critical load 108, whereas said second neutral line 122 is provided to be connected to a neutral. A third converter 103, which is a DC/DC converter, has a second DC input and a second DC output, said second DC input being provided to be connected to a DC power supply. A fourth converter 104, which is another DC/DC converter, has a third DC input and a third DC output. The first DC output is connected to the third DC input, the third DC output to the second DC input and the second DC output to the first DC input.

The second converter 102 connected to the third converter 103 form together an inverter 100b, and the first converter 101 connected to the fourth converter 104 form together a rectifier 100a. A battery 106 is typically used as a DC power supply and therefore connected between the output from the rectifier 100a and the input from the inverter 100b. A switching unit 105 comprising switches 105a and 105b and a micro-controller 105c to control the switches is foreseen to allow to switch between a connection using the power processor formed by the rectifier 100a and inverter 100b and a connection through the cable 107. The critical load 108 is here illustrated by one resistance. In practise, the critical load may be formed by a plurality of units connected in parallel to the processor.

A problem with this known configuration as illustrated in FIG. 1 is that the efficiency is relatively low. From the single-phase AC power supply to the critical load, the current needs to pass through four converters and one switch. The efficiency obtained through such a circuit is typically around 80%. When the critical load is fed with the DC power supply, the current needs to pass through two converters and one switch yielding an efficiency in the order of 90%.

U.S. Pat. No. 4,709,318 discloses an alternative configuration which comprises just three converters, these three converters being a first converter, which is an AC/DC converter with a first AC input and a first DC output, a second converter, which is a DC/AC converter with a first DC input and a first AC output, and a third converter, which is a DC/DC converter provided with a second DC input and a second DC output. In this alternative configuration of the state of the art, the first AC input is provided to be connected to an AC power source, the first AC output is provided to be connected to a critical load, the second DC input is provided to be connected to a DC power source and both the first and second DC outputs are connected to two DC voltage busses in turn connected to the first DC input. With this configuration, the current only needs to pass through two converters between the AC power supply and the critical load. However, in this disclosure the first and second converters are such that the voltage between the DC voltage busses is comparatively high, namely 400 V DC to achieve a 120 V RMS AC output voltage. Such high voltage requires dimensioning the elements of the converters accordingly, increasing the cost while reducing both efficiency and reliability.

United States Patent Application Publication US 2005/0162137 A1 discloses a power backup processor comprising the features of the preambles of the independent claims. In particular, this power backup processor comprises three AC phase input lines, each comprising an inductance and provided to be connected to a three-phase AC power supply, three AC phase output lines, each comprising another inductance and provided to be connected to a critical load, a first neutral line, first and second DC voltage busses provided to be connected to a DC power supply, a capacitor interposed between the first and second DC voltage busses, and a half-bridge circuit for each one of the three AC phase input lines, three AC phase output lines and first neutral line. Each half-bridge circuit comprises a switch connected between the corresponding AC phase input, AC phase output or neutral line and the first DC voltage bus and another switch connected between the same corresponding AC phase input, AC phase output or neutral line and the second DC voltage bus. This configuration also comprises a series of controllers provided to command all switches using pulse width modulation. In operation, the half-bridge circuits corresponding to the three AC phase input lines are commanded using pulse width modulation so as to generate, from the three-phase AC input, a nearly continuous positive voltage at the first DC voltage bus and a nearly continuous negative voltage at the second DC voltage bus. The half-bridge circuit corresponding to the first neutral line is commanded merely to compensate minor voltage fluctuations at the first and second DC voltage busses, both switches of this half-bridge being closed only for a very small percentage of the time and in very short pulses. The first neutral line in this configuration therefore operates merely as a "0" volts axis. The normal object of this device is the zero sequence generation to reduce harmonic voltages on a three-phase output. These configuration and control method, apart from being suitable only for three-phase AC power supplies, furthermore also require a comparatively high DC voltage between the first and second DC voltage busses, namely up to 862 V DC for an output line-to-neutral voltage of 277 V.

It is a primary object of the present invention to provide a power backup processor and a method of operating said power backup processor suitable for a single-phase AC power supply and with a higher efficiency, at least when the critical load is fed with the single-phase AC power supply, while having a high availability and quality of voltage supply, and avoiding the drawbacks related to high DC voltages.

To this end, the power backup processor unit further comprises a fourth half-bridge circuit comprising seventh and eighth switches, wherein the seventh switch is connected between the second AC output line and the first DC voltage bus and the eighth switch is connected between the second AC output line and the second DC voltage bus, the series of controllers being provided to open the fifth switch and close the sixth switch for a period $t_1$ of at least 50%, and preferably at least 95%, of a first half of a cycle of $V_{L,in}$ and close the fifth switch and open the sixth switch for a period $t_2$ of at least 50%, and preferably at least 95%, of a second half of said cycle of $V_{L,in}$. Preferably, said series of controllers is also provided to open the seventh switch and close the eighth switch for a period $t_1'$ of at least 50%, and preferably at least 95%, of a first half of a cycle of $V_{L,out}$ and close the third switch and open the fourth switch for a period $t_2'$ of at least 50%, and preferably at least 95% of a second half of said cycle of $V_{L,out}$. This arrangement generates a voltage $V_{N,out}$ at the second AC output line that runs countercyclically to $V_{L,out}$. As a result, the voltage $V_{Load}$ between the two connections to the load has an amplitude that is the sum of those of $V_{L,out}$ and $V_{N,out}$. An efficiency in the order of 90% can be obtained with the AC power supply. In addition, this circuitry has fewer components and is hence simplified when comparing it with prior art circuitries. A further consequence is that it allows having simultaneously a sinusoidal input current (without harmonics) while having a non linear critical load at the output supplied by a sinusoidal voltage with a non sinusoidal current (with current harmonics). This insures proper harmonic filtering of the AC input voltage and simultaneously the AC output current. It further allows proper functioning when a small phase shift between input (AC power supply) and output (at the critical load) is present as well as in case small voltage differences between input and output occur.

Alternatively, the neutral line is provided to be directly connected to the second AC output line, and the power backup processor further comprises a third inductance connected between the neutral line and the third half-bridge circuit, the series of controllers being provided to open the fifth switch and close the sixth switch for a period $t_1$ of at least 50%, and preferably at least 95%, of a first half of a cycle of $V_{L,in}$ and close the fifth switch and open the sixth switch for a period $t_2$ of at least 50%, and preferably at least 95%, of a second half of said cycle of $V_{L,in}$. This second embodiment also generates a $V_{N,out}$ that is countercyclical to $V_{L,out}$. While in this simpler arrangement it is not possible to change the frequency and phase displacement of $V_{L,out}$ with respect to $V_{L,in}$, the reduction in the number of components further increases the reliability, as well as the efficiency, which can reach around 95%.

Advantageously, the fifth and sixth switches and/or the seventh and eight switches are pulse-width moderated during a period $t_3$, respectively $t_3'$, between $t_1$ and $t_2$, respectively $t_1'$ and $t_2'$, so that $V_{N,out}$ presents a continuity of at least its first and second derivates. This improves the longevity of the components and the cleanliness of the output.

Preferably, the series of controllers consists of one controller unit. As opposed to individual controllers for each converter, this allows managing more efficiently and easily the energy flow, without the need of adding additional components to manage communication between individual controllers.

Preferably, the power backup processor unit further comprises a DC/DC converter connected to the first and second DC voltage busses for connecting said first and second DC voltage busses to said DC power source. This allows the use of a DC power source with a different, usually lower, voltage than the voltage between the two DC voltage busses.

In a particular embodiment, the DC/DC converter is bi-directional. This makes it possible to use the device according to the invention as a rectifier, wherein current would flow from the AC input to the DC power source for recharging.

Advantageously, the first, second, fifth and sixth switches are power bi-directional and the series of controllers is provided to run the first half-bridge circuit in reverse, so as to convert a DC voltage between the two DC voltage busses into an AC voltage at the first AC input line. This allows using the device according to the invention as a means to supply energy from the DC power input into the AC power supply. A current flow in this direction could be applied for example in photovoltaic cell applications, wherein the energy generated by the cells is fed back to the AC power supply when not used by the critical load.

It can further be advantageous if the third, fourth and, if provided, the seventh and eighth switches are power bi-directional, and the series of controllers is also provided to run the second half-bridge circuit in reverse, so as to convert an AC voltage between the first and second AC output lines into a DC voltage between the two DC voltage busses. This allows the recuperation of energy from the critical load back into the AC and/or DC power supply, which principle could be applied to elevator systems.

Preferably, the power backup processor according to the invention comprises a plurality of power backup processor units connected in parallel, each power backup processor unit comprising the first, second and third converters as claimed in any one of the preceding claims. This allows to guarantee continuous operation should one of the units fail to operate and without the presence of a single point of failure element such as switch 105a in the prior art device of FIG. 1.

The device according to particular embodiments of the invention allows to suppress the following two negative effects occurring simultaneously and present in the prior art devices as illustrated in FIG. 1. First, when power is supplied through switch 105b and cable 107, disturbances can occur by supplying power to the critical load without filtering. Secondly, when a critical non linear load is supplied, harmonic currents are generated on the AC power supply. This can lead to deterioration of the quality of the AC power supply voltage caused by harmonic currents which are applied to the AC power supply.

Other details and advantages will appear from the description of the annexed drawings.

Figure 1:
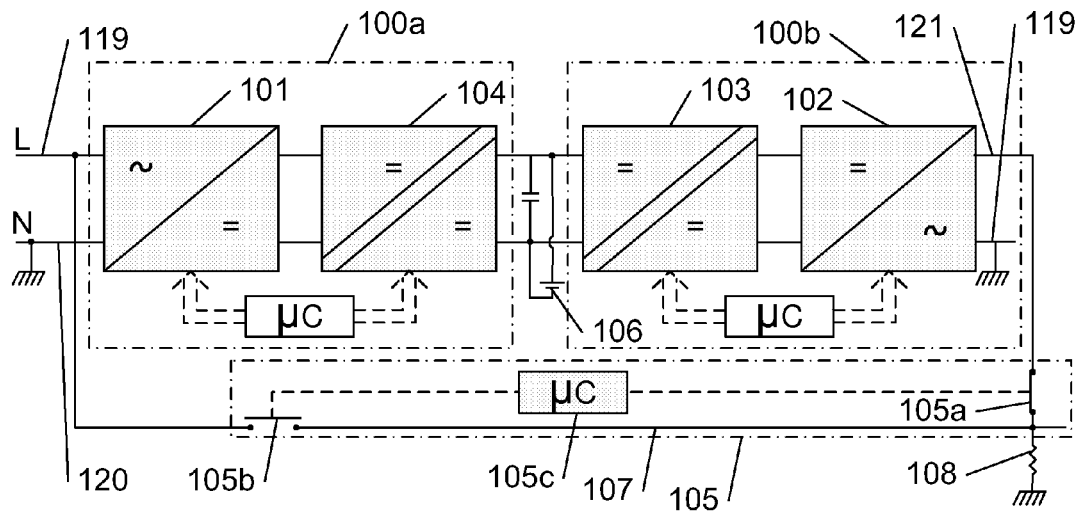
FIG. 1 illustrates a typical configuration of a power backup processor according to the prior art.
Figure 2:
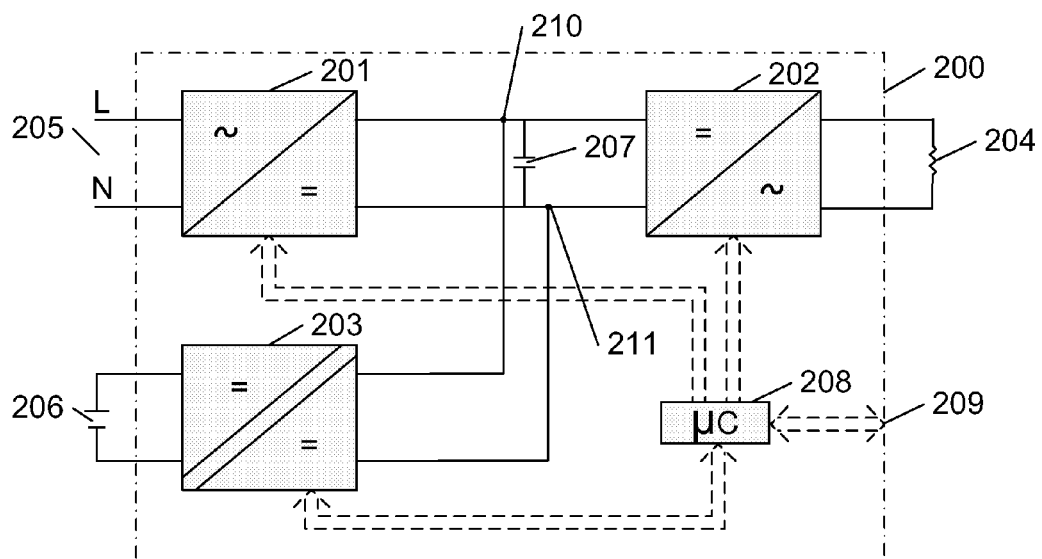
FIG. 2 illustrates a first embodiment of the power backup processor unit according to the invention.

In a first embodiment of the invention, as illustrated in FIG. 2, a power processor unit 200 comprises a first converter 201 comprising an AC input connected to an AC power supply 205. This converter is provided to convert AC power at for example 230 V AC RMS to a DC power at for example 350-400 V DC. The DC output of this first converter is connected to a DC input of a second converter 202. The second converter 202 is provided to convert de DC power to AC power of for example 230 V AC RMS, which is then fed to the critical load 204. The path formed by the first and the second converters is used when power needs to be fed from the AC power supply 205.

The power processor unit 200 is further provided to receive power from a DC power supply 206 such as a battery providing a DC power at for example 48 V DC. Since the DC input of the second converter usually has a considerably higher voltage, the power processor unit 200 will also comprise a third converter 203 comprising a DC input provided to be connected to the DC power supply 206 and a DC output. The third converter 203 is preferably an isolated converter (as represented by the double diagonal line), but could in some application be non isolated. According to the invention and as illustrated in FIG. 2, this DC output is connected to both the DC output from the first converter 201 and the DC input from the second converter. The path formed by the third and the second converters is thus used when power needs to be fed from the DC power supply 206.

A capacitor 207 is provided between the output of the first converter 201 and the input of the second converter 202 and acts an energy storage unit. A micro-controller or controller 208 is connected to each of the three converters 201, 202 and 203 to communicate commands to each of the converters. The micro-controller is further connected to communication output 209.

Figure 3:
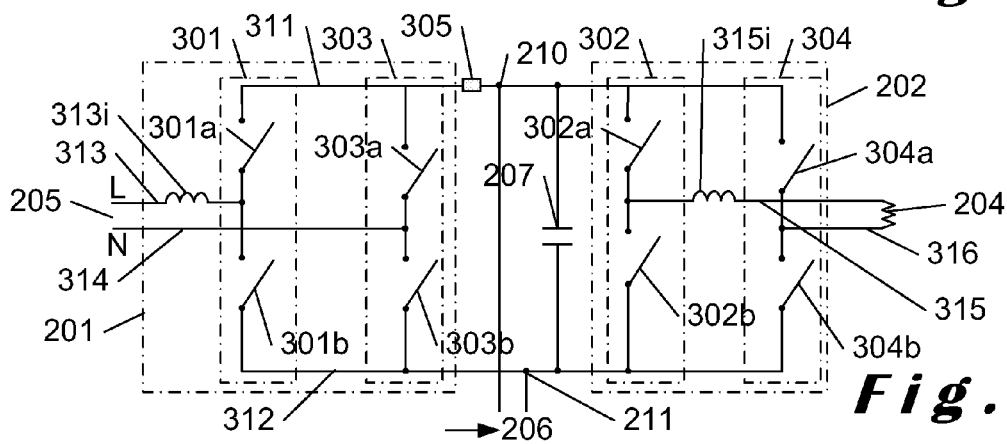
FIG. 3 illustrates part of said first embodiment of the power backup processor unit according to the invention.

FIG. 3 shows in more detail the first and second converters 201 and 202 of the power processor according to this first embodiment of the present invention. The first converter 201 comprises a first and a third half-bridge circuit 301, 303, both connected between a first and a second DC voltage bus 311, 312. The first half-bridge circuit 301 comprises a first switch 301a connected between an AC input line 313, comprising a first inductance 313i, and the first DC voltage bus 311, and a second switch 301b connected between the AC input line 313 and the second DC voltage bus 312. The third half-bridge circuit 303 comprises a fifth switch 303a, connected between a neutral line 314 and the first DC voltage bus 311, and a sixth switch 303b, connected between the neutral line 314 and the second DC voltage bus 312. The second converter 202 comprises a second and a fourth half-bridge circuit 302, 304, both also connected between the first and the second DC voltage bus 311, 312. The second half-bridge circuit 302 comprises a third switch 302a, connected between a first AC output line 315, comprising an inductance 315i, and the first DC voltage bus 311, and a fourth switch 302b, connected between the first AC output line 315 and the second DC voltage bus 312. The fourth half bridge circuit 304 comprises a seventh switch 304a, connected between a second AC output line 316 and the first DC voltage bus 311, and an eighth switch 304b, connected between the second AC output line 316 and the second DC voltage bus 312. The DC/DC converter 203 and the capacitor 207 are then connected to the first and second DC voltage busses 311, 312 between the first and second converters 201 and 202.

Figure 4:
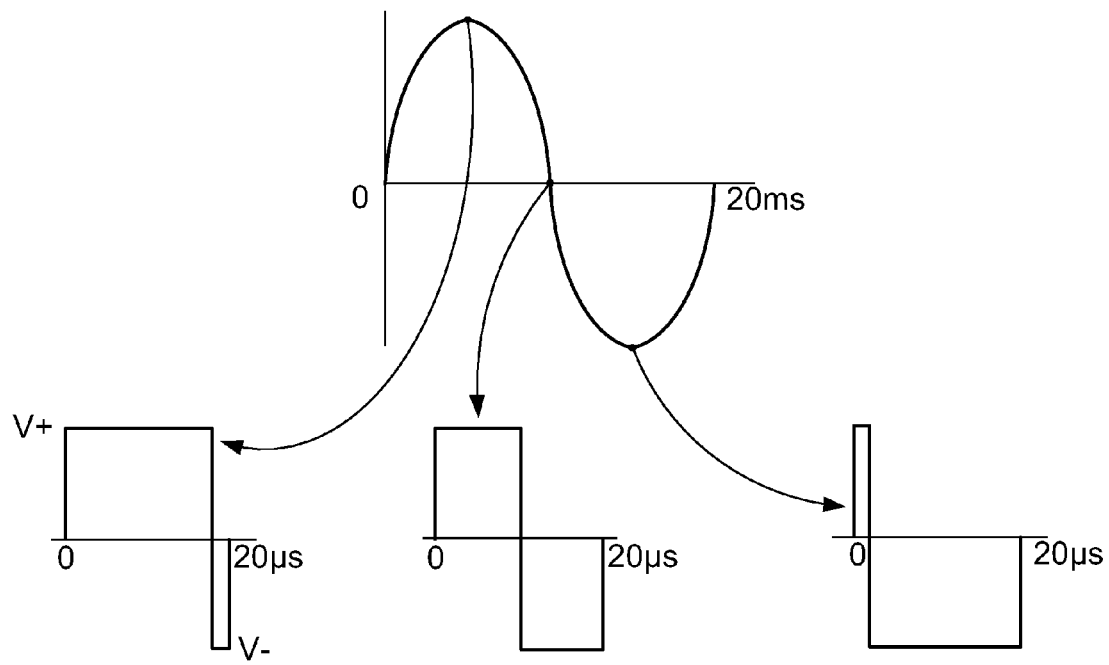
FIG. 4 illustrates voltage conversion using pulse width modulation.

To convert the cyclical, substantially sinusoidal voltage of the AC power supply into a continuous voltage between the first and second DC voltage busses 311, 312, and to convert said continuous voltage back into a cyclical voltage between the first and second AC output lines 315, 316, the micro-controller 208 commands the switches of at least the first and second half-bridge circuits 301, 302 using pulse width modulation (PWM). Pulse width modulation uses a square wave whose duty cycle is modulated resulting in the variation of the average value of the waveform. By switching voltage with the approximate duty cycle, the output will approximate a voltage at the appropriate level, as depicted in FIG. 4. The first and second inductances 313i, 315i and the capacitor 207 attenuate the switching noise. The duty cycle of the square waveform is much shorter than that of the sine wave of either the input or output AC voltages, typically in the order of magnitude of microseconds, e.g. 20 μs vs. 20 ms for a typical 50 Hz AC voltage.

When the first AC input line 313 is connected to a single-phase AC power supply, a variable, cyclical voltage $V_{L,in}$ is established at the first AC input line 313 in the form of a substantially sinusoidal wave. This AC voltage $V_{L,in}$ has a frequency $f_{L,in}$, and therefore a cycle length $1/f_{L,in}$, and an amplitude $V_{L,inPeak}$. $V_{L,inPeak}$ can be, for example 325 V, corresponding to an RMS AC voltage $V_{L,inRMS}$ of 230 V, and $f_{L,in}$ can be, for example, 50 Hz. During the first half of each cycle of $V_{L,in}$, the controllers leave the fifth switch 303a open, while the sixth switch 303b is closed so as to connect the second DC voltage bus 312 to the neutral line 314 and the first half-bridge circuit 301 is pulse width modulated to convert the variable positive voltage at the first AC input line 313 into a continuous voltage $+V_b$ at the first DC voltage bus 311. During the second half of each cycle of $V_{L,in}$, the controllers close the fifth switch 303a, while the sixth switch 303b is opened so as to connect the first DC voltage bus 311 to the neutral line 314, and the first half-bridge circuit 301 is pulse width modulated to convert the variable negative voltage at the first AC input line 313 into a continuous voltage $-V_b$ at the second DC voltage bus 312. As a result, a substantially continuous voltage difference $2V_b$ is generated between the first DC voltage bus 311 and the second DC voltage bus 312. The first inductance 313i filters the switching noise of the first and second switches 301a, 301b.

In the second half-bridge circuit 302, the third switch 302a and the fourth switch 302b, respectively connecting the first DC voltage bus 311 and the second DC voltage bus 312 to the first AC output line 315, are pulse width modulated so as to generate a cyclical, close to sinusoidal voltage $V_{L,out}$ at the first AC output line, with a frequency $f_{L,out}$, an amplitude $V_{L,outPeak}$ close to $V_b$ and a phase displacement $\Delta\phi$ with respect to $V_{L,in}$. The second inductance 315i filters the switching noise of the third and fourth switches 302a, 302b.

In this first embodiment of the power backup processor of the invention, as illustrated in FIG. 3, the seventh switch 304a is open during at least part of the first half of each cycle of $V_{L,out}$ and closed during at least part the second half. Inversely, the eighth switch 304b is closed during at least part of the first half and opened during at least part of the second half. As a result, a counter-cyclical voltage $V_{N,out}$ is generated at the second AC output line 315.

Figure 5:
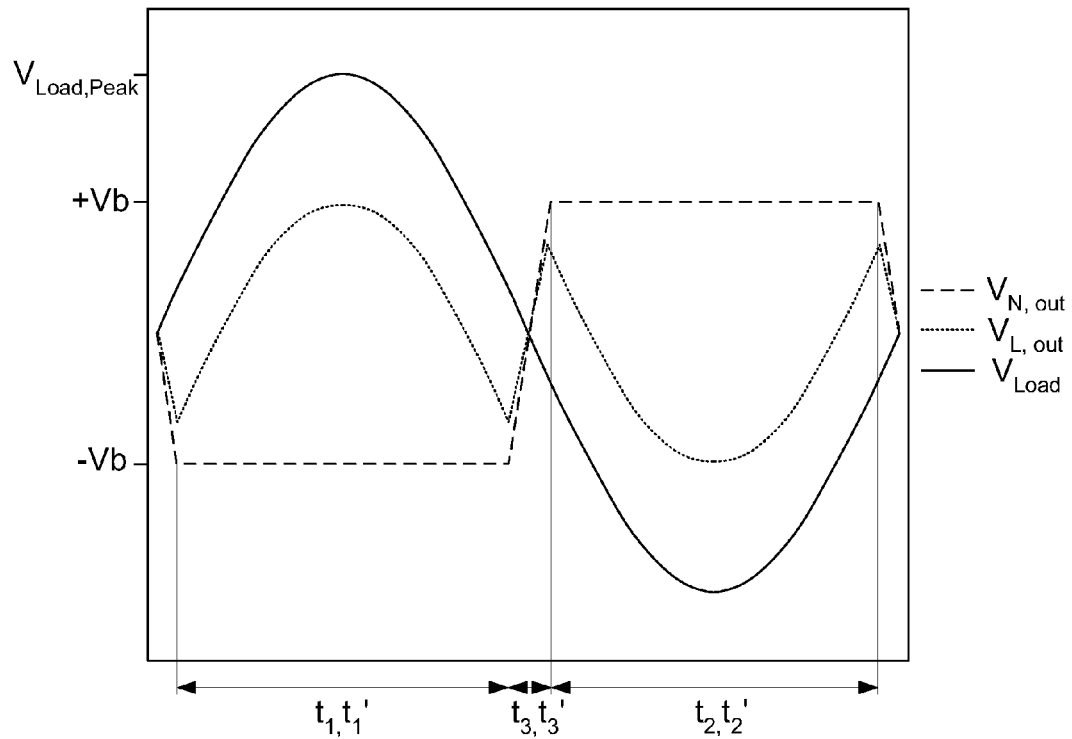
FIG. 5 illustrates an example of the output voltages of the power backup processor unit according to the invention.

FIG. 5 illustrates a cycle of the output voltages $V_{L,out}$, $V_{N,out}$ and $V_{load}=(V_{N,out}-V_{L,out})$. During a period $t_1'$ of at least 95% of the first half-cycle, during which the seventh switch 304a is open and the eighth switch 304b closed, $V_{N,out}$ is substantially constant and equal to $-V_b$. During a period $t_2'$ of at least 95% of the second half-cycle, during which the seventh switch 304a is closed and the eighth switch 304b open, is $V_{N,out}$ substantially constant and equal to $+V_b$. During the transition period $t_3'$ between $t_1'$ and $t_2'$, this fourth half-bridge circuit 304 is preferably pulse-width modulated to ensure a smooth transition between $-V_b$ and $+V_b$ and vice versa. A similar transition period also takes place between $t_2'$ and $t_1'$. Ideally, both the first and the second derivatives of $V_{N,out}$ are continuous. Each one of the periods $t_1'$ and $t_2'$ can be continuous or split in several segments of, respectively, the first or second half-cycles. They can also be centred around the peaks of $V_{L,out}$, as depicted, or, on the contrary, advanced or delayed with respect to those peaks and have the same or different lengths.

As $V_{N,out}$ is countercyclical to $V_{L,out}$, the output voltage $V_{load} = (V_{N,out} - V_{L,out})$ supplied to the critical load has nearly twice the amplitude of $V_{N,out}$, as depicted in FIG. 5. This allows a comparatively high output voltage $V_{load}$ with a comparatively moderate DC voltage difference $2V_b$ between the first DC voltage bus 311 and the second DC voltage bus 312. If $V_{N,out}$ is substantially square or trapezoidal, it is preferable to adapt the pulse width modulation of the second half-bridge circuit 302 so that $V_{L,out}$ has a corrected sinusoidal form that in combination with $V_{N,out}$ results in a closer to sinusoidal $V_{load} = (V_{N,out} - V_{L,out})$, as illustrated in FIG. 5.

Figure 6:
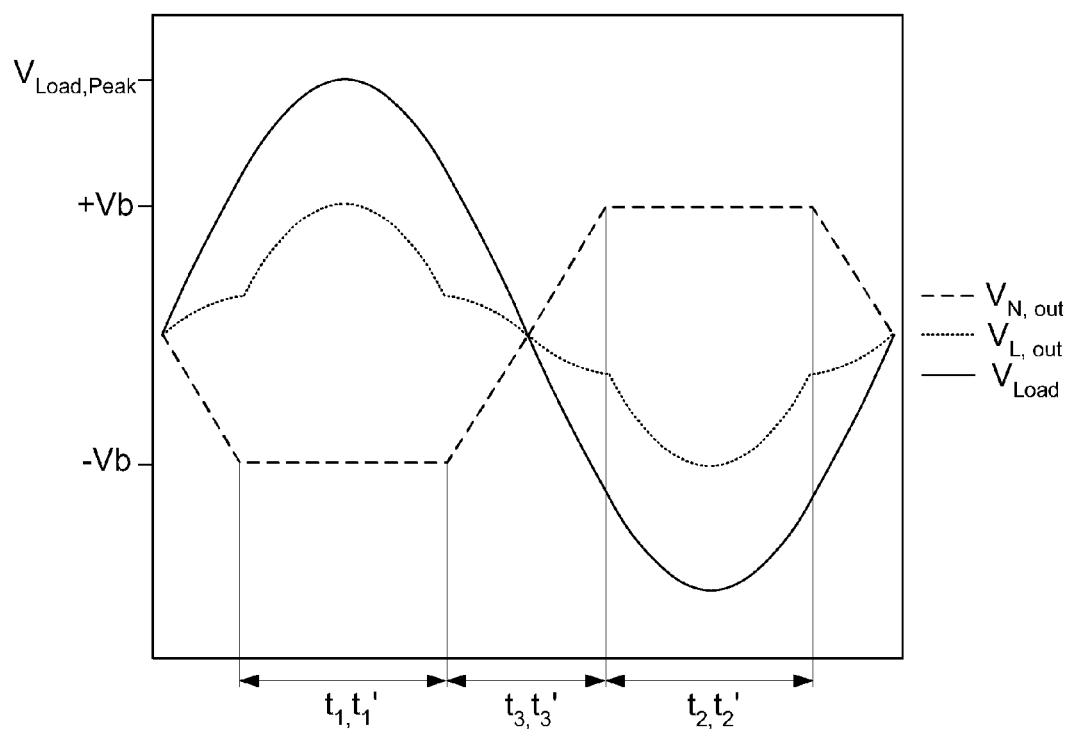
FIG. 6 illustrates another example of the output voltages of the power backup processor unit according to the invention.

Depending on the length of $t_1'$ and $t_2'$, the slope of $V_{N,out}$ between $-V_b$ and $+V_b$ will be more or less pronounced, leading to a more square or trapezoidal wave shape, as can be seen by comparing FIG. 5 and FIG. 6, corresponding to an alternative where each one of $t_1'$ and $t_2'$ correspond to less than 95% but at least 75% of each half-cycle. Having such a substantially square or trapezoidal wave shape for $V_{N,out}$ would result in a distorted wave shape of $V_{load}$ if the second half-bridge circuit 302 was pulse-width modulated to produce a sinusoidal wave shape of $V_{L,out}$. For this reason, the second half-bridge circuit 302 is commanded so that $V_{L,out}$ follows a corrected sine wave, as depicted in FIGS. 5 and 6, resulting in a substantially sinusoidal $V_{load}$. While the fourth half-bridge circuit 304 could instead be pulse-width modulated during the whole cycle, so as to generate a sinusoidal $V_{N,out}$ that would not distort $V_{L,out}$, this would be considerably less energy-efficient than pulse-width modulating only the second half-bridge circuit 302 for the whole cycle with a corrected wave shape instead. The shorter the transition periods between $t_1'$ and $t_2'$, the bigger the correction of the wave shape of $V_{L,out}$ will have to be. On the other hand, shorter transition periods between $t_1'$ and $t_2'$ have the advantage of limiting the number of switchovers of the fourth half-bridge circuit 304, with the corresponding advantages in higher efficiency, lower radio interference generation, etc.

It is particularly advantageous to command both the third and the fourth half-bridge circuits 303, 304 using this method. However, it is also possible to command just one of them in this manner.

Figure 7:
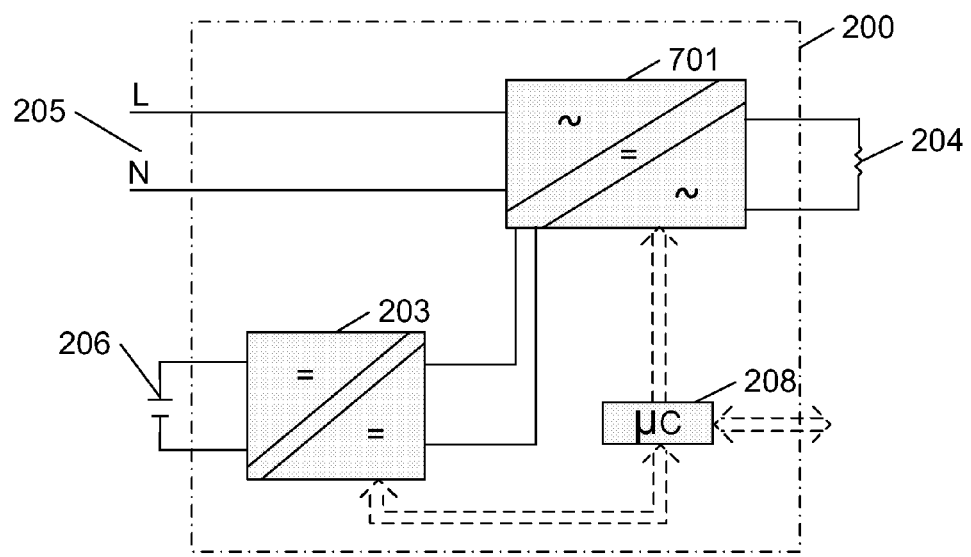
FIG. 7 illustrates a second embodiment of the power backup processor according to the invention.
Figure 8:
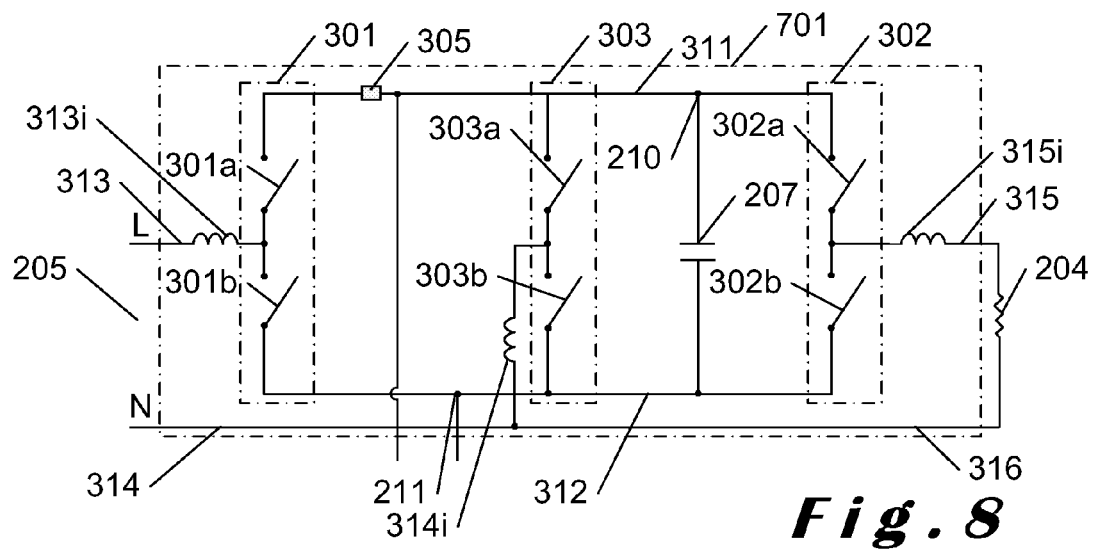
FIG. 8 illustrates part of said second embodiment of the power backup processor according to the invention.

FIGS. 7 and 8 illustrate a simplified second embodiment of the power backup processor of the invention. In this second embodiment, the second half-bridge circuit 302 is synchronised with the first half-bridge circuit 301, so that $V_{L,out}$ has substantially, or even precisely, the same frequency and phase as $V_{L,in}$. Since the third half-bridge circuit 303 is controlled so that the neutral line 314 is connected to the second DC voltage bus 312 during the first half of the cycle of $V_{L,in}$ and therefore, in this embodiment, also of $V_{L,out}$, and to the first DC voltage bus 311 during the second half of the same cycle, this allows to dispense with the fourth half-bridge circuit 304 of the first embodiment and to connect the second AC output line 316 directly to the neutral line 314 instead. However, in this embodiment a third impedance 314i has to be interposed between the neutral line 314 and the third half-bridge circuit 303 to filter the switching noise of the fifth and sixth switches 303a, 303b.

As shown in FIG. 7, this forms, with the capacitor 207, one AC/DC/AC converter 701.

In this second embodiment, the third half-bridge circuit 303 is also controlled in the way depicted by FIG. 5 or 6, wherein during a period $t_1$ of at least 95%, respectively at least 75% of the first half-cycle, during which the fifth switch 303a is open and the sixth switch 303b closed, $V_{N,out}$ is substantially constant and equal to $-V_b$. During a period $t_2$ of at least 95%, respectively at least 75% of the second half-cycle, during which the fifth switch 303a is closed and the sixth switch 303b open, $V_{N,out}$ is substantially constant and equal to $+V_b$. During the transition period $t_3$ between $t_1$ and $t_2$, this third half-bridge circuit 304 is preferably pulse-width modulated to ensure a smooth transition between $-V_b$ and $+V_b$ and vice versa. Ideally, both the first and the second derivatives of $V_{N,out}$ are continuous. Each one of the periods $t_1$ and $t_2$ can be continuous or split in several segments of, respectively, the first or second half-cycles. They can also be centred around the peaks of $V_{L,out}$, as depicted, or, on the contrary, advanced or delayed with respect to those peaks and have the same or different lengths.

As shown in FIGS. 3 and 8, protection means 305 are preferably provided in one of the first or second DC voltage busses 311, 312, upstream of the connection 210 or 211, respectively, to the DC power source 206 and of the capacitor 207. The protection means 305 consist in particular of a fuse and allow to use the DC power source 206 when the first half-bridge circuit 301 breaks and could possibly short-circuit the DC voltage at the capacitor 207.

The DC/DC converter 203 in both the first and the second embodiments can be bi-directional, thus allowing to direct power from the DC voltage busses 311,312 back to the DC power source 206, for instance for recharging a battery being used as the DC power source 206.

The first and second converters 201,202 of the first embodiment and the AC/DC/AC converter 701 of the second embodiment can also be power bi-directional, allowing the recuperation of energy from the critical load 204 and/or the DC power source 206. For this purpose, the switches of the half-bridge circuits forming these first and second converters will have to be power bi-directional themselves, and the series of controllers 208 will have to be provided to run these converters 201 and/or 202 or 203 also in reverse. The switches of the half-bridge circuits can in particular be IGBT switches with antiparallel diodes.

Figure 9:
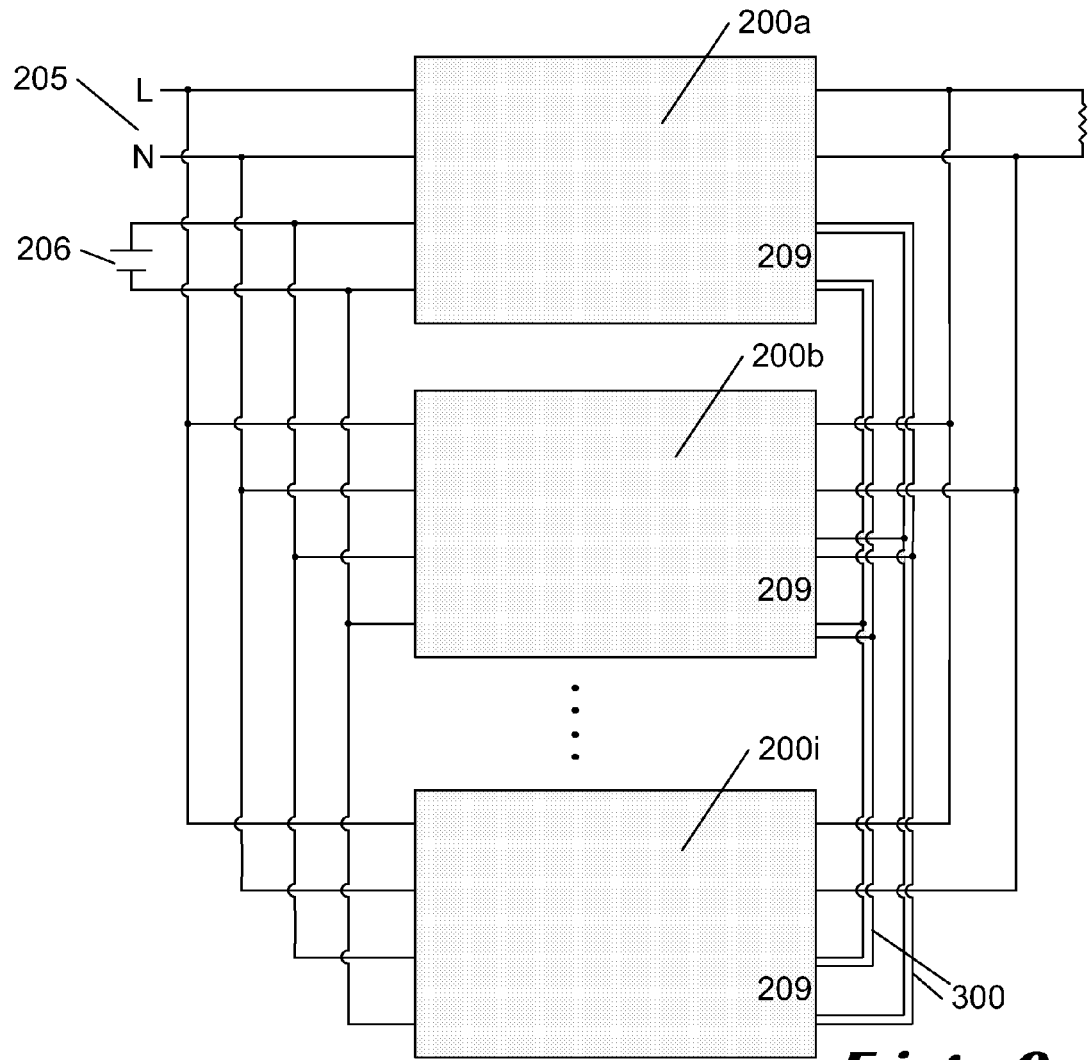
FIG. 9 illustrates a further embodiment of the power backup processor according to the invention with several units in parallel.

FIG. 9 shows an embodiment from the processor according to the present invention comprising a plurality of processor units 200a, 200b, . . . 200i connected in parallel. Each of the processor units 200a, 200b, . . . 200i has a configuration as shown in FIG. 2 or 7. A communication bus 300 connects the communication outputs 209 of the processor units. Hence the micro-controllers of the processor units are interconnected to allow synchronisation of the first AC outputs and to organise load sharing between the units. The principles of synchronisation and load sharing between units are known to the person skilled in the art and thus do not need to be described in detail. Preferably, as illustrated in FIG. 9, the communication bus comprises a double connection between the units to provided redundancy in case one of the connections would fail. Instead of a cable connection, wireless connection using IR or HF technology, in particular Bluetooth technology, is also conceivable. It is also conceivable to provide one connection with cables and the other connection as a wireless connection.

As will be appreciated, modifications are conceivable without falling outside the scope of the appended claims. For example, it is conceivable, instead of providing one micro-controller for each processor unit as illustrated in FIG. 2, one micro-controller for each converter 201, 202 and 203 with communication means between each of the controllers. Having only one controller per processor unit is however advantageous, since it does not require means to ensure proper communication between the controllers of a same processor unit. As can be seen in the drawings, it is important that the three converters converge in one point: a DC bus bar at the capacitor 207.

The invention claimed is:

1. A power backup processor unit comprising:
   a) a first AC input line comprising a first inductance and provided to be connected to an AC power supply, with a cyclical voltage $V_{L,in}$;
   b) a first AC output line comprising a second inductance and provided to be connected to a critical load;
   c) a second AC output line provided to be connected to the critical load;
   d) a neutral line provided to be connected to a neutral port;
   e) first and second DC voltage busses provided to be connected to a DC power supply;
   f) a capacitor interposed between the first and second DC voltage busses;
   g) a first half-bridge circuit comprising a first switch and a second switch, wherein the first switch is connected between the first AC input line and the first DC voltage bus and the second switch is connected between the first AC input line and the second DC voltage bus;
   h) a second half-bridge circuit comprising a third switch and a fourth switch, wherein the third switch is connected between the first AC output line and the first DC voltage bus and the fourth switch is connected between the first AC output line and the second DC voltage bus;
   i) a third half-bridge circuit comprising a fifth switch and a sixth switch, wherein the fifth switch is connected between the neutral line and the first DC voltage bus and the sixth switch is connected between the neutral line and the second DC voltage bus;
   j) a series of controllers provided to command the switches, wherein said series of controllers is provided to command at least the first to fourth switches using pulse width modulation to convert $V_{L,in}$ into two different, substantially continuous voltages $+V_b, -V_b$ at the first and the second DC voltage busses and said two different, substantially continuous voltages $+V_b, -V_b$ into a cyclical voltage $V_{L,out}$ at the first AC output line;
   and characterised in that it also comprises
   k) a fourth half-bridge circuit comprising a seventh switch and an eighth switch, wherein the seventh switch is connected between the first DC voltage bus and the second AC output line and the eighth switch is connected between the second DC voltage bus and the second AC output line; and
   in that said series of controllers is also provided to open the fifth switch and close the sixth switch for a period $t_1$ of at least 50%, and preferably at least 95%, of a first half of a cycle of $V_{L,in}$ and close the fifth switch and open the sixth switch for a period $t_2$ of at least 50%, and preferably at least 95%, of a second half of said cycle of $V_{L,in}$.

2. A power backup processor unit according to claim 1, characterized in that said series of controllers is also provided to open the seventh switch and close the eighth switch for a period $t_1'$ of at least 50%, and preferably at least 95%, of a first half of a cycle of $V_{L,out}$ and close the seventh switch and open the eighth switch for a period $t_2'$ of at least 50%, and preferably at least 95% of a second half of said cycle of $V_{L,out}$.

3. A power backup processor unit according to claim 2, characterized in that said series of controllers is also provided to pulse-width modulate said fourth half-bridge circuit during a transition period $t_3'$ between $t_1'$ and $t_2'$.

4. A power backup processor unit according to claim 1, characterised in that the third, fourth, seventh and eighth switches are power bi-directional, and the series of controllers is provided to run the second half-bridge circuit in reverse, so as to convert an AC voltage between the first and second AC output lines into a DC voltage between the two DC voltage busses.

5. A power backup processor unit comprising:
   a first AC input line comprising a first inductance and provided to be connected to an AC power supply with a cyclical voltage $V_{L,in}$;
   b) a first AC output line comprising a second inductance and provided to be connected to a critical load;
   c) a second AC output line provided to be connected to the critical load;
   d) a neutral line provided to be connected to a neutral port;
   e) first and second DC voltage busses provided to be connected to a DC power supply;
   f) a capacitor interposed between the first and second DC voltage busses;
   g) a first half-bridge circuit comprising a first switch and a second switch, wherein the first switch is connected between the first AC input line and the first DC voltage bus and the second switch is connected between the first AC input line and the second DC voltage bus;
   h) a second half-bridge circuit comprising a third switch and a fourth switch, wherein the third switch is connected between the first AC output line and the first DC voltage bus and the fourth switch is connected between the first AC output line and the second DC voltage bus;
   i) a third half-bridge circuit comprising a fifth switch and a sixth switch, wherein the fifth switch is connected between the neutral line and the first DC voltage bus and the sixth switch is connected between the neutral line and the second DC voltage bus;
   j) a series of controllers provided to command the switches, wherein said series of controllers is provided to command at least the first to fourth switches using pulse width modulation to convert $V_{L,in}$ into two different, substantially continuous voltages $+V_b, -V_b$ at the first and the second DC voltage busses and said two different, substantially continuous voltages $+V_b, -V_b$ into a cyclical voltage $V_{L,out}$ at the first AC output line;
   and characterised in that it also comprises
   k) a third inductance connected between said neutral line and said fifth and sixth switches;
   in that said second AC output line is directly connected to said neutral line;
   in that said series of controllers are provided to synchronize said first and second half-bridge circuits so that $V_{L,in}$ and $V_{L,out}$ have substantially the same phase and frequency, and
   in that said series of controllers is also provided to open the fifth switch and close the sixth switch for a period $t_1$ of at least 50%, and preferably at least 95%, of a first half of a cycle of $V_{L,in}$ and close the fifth switch and open the sixth switch for a period $t_2$ of at least 50%, and preferably at least 95%, of a second half of the cycle of $V_{L,in}$.

6. A power backup processor unit according to claim 5, characterized in that said series of controllers is also provided to pulse-width modulate said fifth switch and said sixth switch during a transition period $t_3$ between $t_1$ and $t_2$.

7. A power backup processor unit according to claim 5, wherein the third and fourth switches are bi-directional, and the series of controllers is also provided to run the second half-bridge circuit in reverse, so as to convert an AC voltage between the first and second AC output lines into a DC voltage between the two DC voltage busses.

8. A power backup processor unit according to claim 1, wherein the series of controllers consists of one controller unit.

9. A power backup processor unit according to claim 1, further comprising a DC/DC converter connected to the first and second DC voltage busses for connecting said first and second DC voltage busses to said DC power source.

10. A power backup processor unit according to claim 9, wherein the DC/DC converter is bi-directional.

11. A power backup processor unit according to claim 1, wherein the first, second, fifth and sixth switches are bi-directional and the series of controllers is provided to run the first half-bridge circuit in reverse, so as to convert a DC voltage between the two DC voltage busses into an AC voltage at the first AC input line.

12. A power backup processor system comprising a plurality of power backup processor units as claimed in claim 1 and connected in parallel.

13. The power backup processor system according to claim 12, further comprising communication means, in particular at least one inter unit communication bus, connected to the controllers of each power backup processor unit.

14. A method of controlling a power backup processor unit, said power backup processor unit comprising:
 a) a first AC input line comprising a first inductance and provided to be connected to an AC power supply with a cyclical voltage $V_{L,in}$;
 b) a first AC output line comprising a second inductance and provided to be connected to a critical load;
 c) a second AC output line provided to be connected to the critical load;
 d) a neutral line provided to be connected to a neutral port
 e) first and second DC voltage busses provided to be connected to a DC power supply;
 f) a capacitor interposed between the first and second DC voltage busses;
 g) a first half-bridge circuit comprising a first switch and a second switch, wherein the first switch is connected between the first AC input line and the first DC voltage bus and the second switch is connected between the first AC input line and the second DC voltage bus;
 h) a second half-bridge circuit comprising a third switch and a fourth switch, wherein the third switch is connected between the first AC output line and the first DC voltage bus and the fourth switch is connected between the first AC output line and the second DC voltage bus;
 i) a third half-bridge circuit comprising a fifth switch and a sixth switch, wherein the fifth switch is connected between the neutral line and the first DC voltage bus and the sixth switch is connected between the neutral line and the second DC voltage bus; and
 wherein said method comprises the steps of:
 j) pulse width modulating said first half-bridge circuit to convert $V_{L,in}$ into two different, substantially continuous voltages $+V_b, -V_b$ at the first and the second DC voltage busses and said second half-bridge circuit to convert said two different, substantially continuous voltages $+V_b, -V_b$ into a cyclical voltage $V_{L,out}$ at the first AC output line;
 and is characterised in that it also comprises the steps of
 k) opening the fifth switch and closing the sixth switch for a period $t_1$ of at least 50%, and preferably at least 95%, of a first half of a cycle of $V_{L,in}$; and
 l) closing the fifth switch and opening the sixth switch for a period $t_2$ of at least 50%, and preferably at least 95%, of a second half of the cycle of $V_{L,in}$.

15. A method according to claim 14 and characterized in that it also comprises the step of pulse-width modulating said fifth switch and said sixth switch during a transition period $t_3$ between $t_1$ and $t_2$.

16. A method according to claim 14 and characterized in that the first and second half-bridge circuits are synchronised so that $V_{L,in}$ and $V_{L,out}$ have substantially the same phase and frequency.

17. A method according to claim 14, wherein said second AC output line is directly connected to the neutral line and said power backup processor unit also comprises a third inductance connected between said neutral line and said fifth and sixth switches.

18. A method according to claim 14 and characterized in that said power backup processor unit further comprises:
 a) a fourth half-bridge circuit comprising a seventh switch and an eighth switch, wherein the seventh switch is connected between the first DC voltage bus and the second AC output line and the eighth switch is connected between the second DC voltage bus and the second AC output line;
 and in that the method also comprises the steps of:
 b) opening the seventh switch and closing the eighth switch for a period $t_1'$ of at least 50%, and preferably at least 95%, of a first half of a cycle of $V_{L,out}$; and
 c) closing the seventh switch and closing the eighth switch for a period $t_2'$ of at least 50%, and preferably at least 95%, of a second half of the cycle of $V_{L,out}$.

19. A method according to claim 14 and characterized in that it also comprises the step of pulse-width modulating said seventh switch and said fourth switch during a transition period $t_3'$ between $t_1'$ and $t_2'$.

* * * * *